(12) United States Patent
Cazares et al.

(10) Patent No.: US 7,936,670 B2
(45) Date of Patent: May 3, 2011

(54) SYSTEM, METHOD AND PROGRAM TO CONTROL ACCESS TO VIRTUAL LAN VIA A SWITCH

(75) Inventors: John Paul Cazares, Speedway, IN (US); Jade W. Clifford, Indianapolis, IN (US); Charles Steven Lingafelt, Durham, NC (US); Robert Barry Sisk, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 11/733,904

(22) Filed: Apr. 11, 2007

(65) Prior Publication Data

US 2008/0253380 A1    Oct. 16, 2008

(51) Int. Cl.
  *G06F 21/20* (2006.01)
(52) U.S. Cl. .................... 370/230; 370/232; 370/392
(58) Field of Classification Search .................. None
  See application file for complete search history.

(56) References Cited

U.S. PATENT DOCUMENTS

| | | | | |
|---|---|---|---|---|
| 2003/0023733 | A1* | 1/2003 | Lingafelt et al. | 709/229 |
| 2004/0010618 | A1* | 1/2004 | Thomas | 709/245 |
| 2004/0027988 | A1 | 2/2004 | Billhartz | |
| 2004/0028000 | A1 | 2/2004 | Billhartz | |
| 2004/0028001 | A1 | 2/2004 | Billhartz | |
| 2004/0123142 | A1* | 6/2004 | Dubal et al. | 713/201 |
| 2005/0021740 | A1* | 1/2005 | Bar et al. | 709/224 |
| 2006/0083254 | A1 | 4/2006 | Ge et al. | |
| 2006/0133377 | A1 | 6/2006 | Jain | |
| 2007/0211626 | A1* | 9/2007 | Gooch et al. | 370/229 |

FOREIGN PATENT DOCUMENTS

KR    2002039559    5/2002

* cited by examiner

*Primary Examiner* — Daniel J Ryman
*Assistant Examiner* — Michael Fialkowski
(74) *Attorney, Agent, or Firm* — Schmeiser, Olsen & Watts; Arthur J. Samodovitz

(57) ABSTRACT

System method and program for controlling access to a VLAN via a port of a VLAN switch system. In response to receipt of a message packet at the port, the switch system determines if a MAC address of the packet matches a MAC address for which the port has been programmed to recognize as a MAC address of a device authorized to communicate with the port. The MAC address of the packet does not match a MAC address for which the port has been programmed to recognize as a MAC address of a device authorized to communicate with the port. In response, the switch system blocks the packet if a rate of ill-formed packets and/or packets from an unrecognized MAC address exceeds a threshold pass rate. The threshold pass rate can be adjusted based on the rate of change of receipt of ill-formed packets and/or packets from an unrecognized MAC address.

20 Claims, 4 Drawing Sheets

SYSTEM, METHOD AND PROGRAM TO CONTROL ACCESS TO VIRTUAL LAN VIA A SWITCH

FIELD OF THE INVENTION

The present invention relates generally to computer systems and networks, and more specifically to control of access to virtual LANs via a switch.

BACKGROUND OF THE INVENTION

Virtual LANs ("VLANs") are well known today to simulate physical networks, and interconnect real or virtual devices on the VLAN to other, real devices external to the VLAN. In a typical VLAN arrangement, there is a VLAN switch with multiple ports to interconnect to respective external real devices. The switch also includes one or more ports to interconnect to one or more VLANs, such that the external devices can communicate to devices on the VLANs via the switch and the VLAN on which the target device resides. There can be one or more virtual or real devices on each VLAN.

Each message (such as a frame) packet received at a port of the switch from an external real device identifies (a) a source MAC address of the external device (such as the MAC address burned into a network adapter card of the external device), although sometimes a hacker will insert the MAC address of another device in the packets it sends, (b) a source IP address, (c) a destination MAC address corresponding to a target device if the target device is on the same LAN or VLAN, (d) a destination IP address, (e) host port of the source device, (f) host port of the destination device, and (e) control bits or "flags". The packet also includes a "body" which includes data needed for the request. VLAN switches include a Content Addressable Memory Table (CAM) which identifies which MAC addresses are authorized to send packets to which ports, and also identifies the MAC addresses of target devices on each VLAN. The VLAN switch uses the CAM table to identify the VLAN of the target device based on the destination MAC address in the packet. The destination IP address does not always map one-for-one to a VLAN for the following reason. The destination IP address in the packet identifies a subnet that is logically defined by the VLAN switch. Each subnet that is logically defined by the VLAN switch may comprise one or more VLANs. The VLAN switch attaches a VLAN tag to the packet to "route" the packet through the switch to the VLAN of the target device.

For security purposes, typically each port of the VLAN switch is programmed to recognize message packets (such as frame packets) from only the (source) MAC address of an authorized external device with the proper MAC address embedded in the packet. The recognized MAC address for each packet is listed in the CAM table for the switch. (A system administrator previously programmed into the CAM table the source MAC address of an authorized external device for each port on the switch.) For example, a Cisco Port Security function in the switch compares the MAC address of the sending device to the MAC address programmed into the switch. If they differ, the Cisco Port Security function can disable the port, so the external device with the unrecognized MAC address cannot send any more packets to any VLANs via the switch. This is important because the external device may be malicious. Alternately, the port can simply drop or discard any packet from a source MAC address which is unrecognized. While both solutions are effective in blocking malicious intrusions into the VLANs, occasionally the external device which possesses an unrecognized MAC address is friendly and is improperly being denied access to the VLANs via the switch. In such a case, the owner of the external device which is unable to access the VLANs will notify an administrator of the VLANs or switch and report the problem. Then, it is the responsibility of the administrator to determine whether the external device should be allowed to access the VLANs via the switch. The administrator can make this decision based on the administrator's knowledge of the network architecture. If the MAC addresses should be allowed to access the VLANs via the switch, the administrator will reprogram the CAM table and switch to recognize the MAC address of the external device as authorized. Consequently, subsequent packets from the external device will pass through the port and switch to the VLAN of the target device. While the foregoing process is effective, there was too much burden on the administrator and oftentimes, too little information, for the administrator to determine whether the external device should be allowed access the VLAN via the switch. Also, packets from a friendly external device with the improper MAC address were often discarded before the switch was reprogrammed to recognize the external device as authorized to communicate with the target device. The switch can be configured to pass packets from an unrecognized MAC address.

There are other types of "incorrect" packets, in addition to packet bearing an unrecognized MAC address, that a port of a VLAN switch may received. Some "incorrect" packets are improperly formed, i.e. deficient in their form as defined by the applicable standard, for example, a "Christmas tree" packet where all options for the protocol in use are turned on. By way of example, an "ill-formed" packet may be missing a field specified by the applicable standard, the data in a field may be longer or shorter than specified in the field, the data in a field may be one type such as numeric characters whereas the standard specifies alphabetic characters, etc. It was known to configure an intrusion prevention system for a VLAN switch to either block or pass "ill-formed" packets.

A known "Cisco Guard DDOS Mitigation Appliance" function in a router limited the rate of packets from a specific source IP address when that source IP address was thought to be conducting a denial of service attack. The router discarded packets above the specified limit rate. An administrator specified the limit to be applied during a presumed denial of service attack.

An object of the present invention is for a VLAN switch to better manage "friendly" packets which bear an unrecognized source MAC address, so they can pass through a VLAN switch to the VLAN of the target device without jeopardizing the target device.

SUMMARY OF THE INVENTION

The present invention resides in a system, method and program for controlling access to a VLAN via a port of a VLAN switch system. In response to receipt of a message packet at the port, the switch system determines if a MAC address of the packet matches a MAC address for which the port has been programmed to recognize as a MAC address of a device authorized to communicate with the port. The MAC address of the packet does not match a MAC address for which the port has been programmed to recognize as a MAC address of a device authorized to communicate with the port. In response, the switch system blocks the packet if a rate of ill-formed packets and/or packets from an unrecognized MAC address exceeds a threshold pass rate.

In accordance with a feature of the present invention, if the rate of ill-formed packets and/or packets from an unrecognized MAC address does not exceed the threshold pass rate, and the packet from said unrecognized MAC address is not ill-formed, the switch system passes the packet from the unrecognized MAC address to a VLAN corresponding to a destination address provided in the packet.

In accordance with another feature of the present invention, a rate of change of receipt of ill-formed packets and/or packets from an unrecognized MAC address is determined. The threshold pass rate is adjusted based on the rate of change of receipt of ill-formed packets and/or packets from an unrecognized MAC address.

DETAILED DESCRIPTION OF THE PREFERRED EMBODIMENTS

Figure 1:
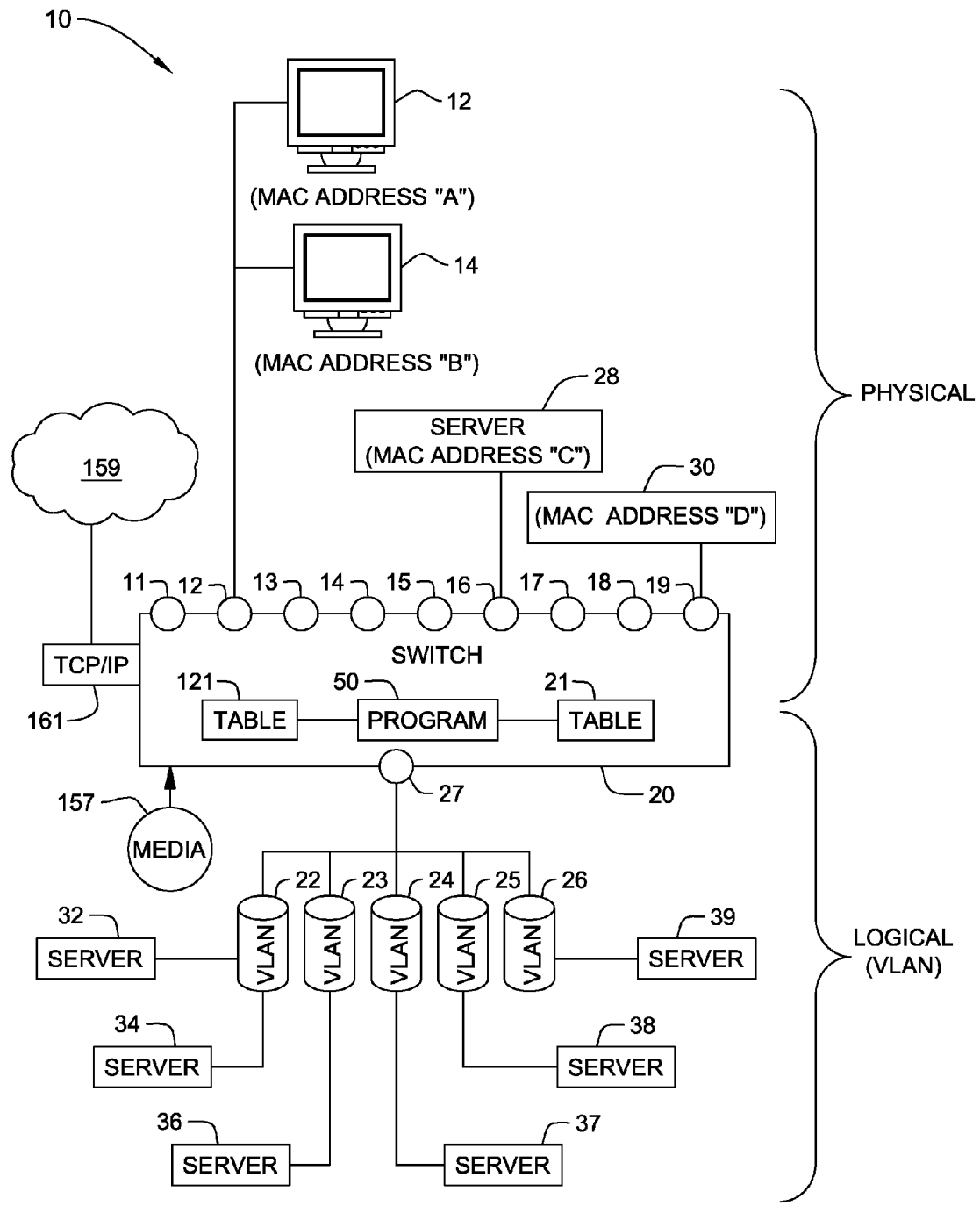
FIG. 1 is a block diagram of a distributed computer system, including VLANs and a VLAN switch with a packet evaluation program according to the present invention.

The present invention will now be described in detail with reference to the figures. FIG. 1 illustrates a distributed computer system generally designated 10 comprising a VLAN switch 20 with ports 11-19 for external computing devices 12, 14, 28 and 30. By way of example, a client computer 12 and a client computer 14 are both connected to port 12, a server computer 28 is connected to port 16 and a Wireless Access Point device 30 is connected to port 19. Each of the external/source devices 12, 14, 28 and 30 has a respective source MAC address, labeled for purposes of explanation as MAC addresses "A", "B", "C" and "D", respectively. Each MAC address is part of the source address of the external/source device. In reality, each MAC address is a twelve-digit hexadecimal number forty eight bits long and conforms to IEEE 802 standard. Each of the ports 12, 16, and 19 is also programmed to recognize one or more source MAC addresses as being authorized to communicate with the port for purposes of explanation, port 12 is programmed to recognize source MAC addresses "A" or "B" as authorized, port 16 is programmed to recognize source MAC address "C" as authorized, and port 19 is programmed to recognize source MAC address "E" (not MAC address "D") as authorized. This "programming" is based on a CAM table 21 which lists for each port 11-19 one or more source MAC addresses authorized to send packets to the port. System 10 also includes VLANs 22-26 connected to port 27 of VLAN switch 20. System 10 also includes servers 32 and 34 connected to VLAN 22, server 36 connected to VLAN 23, server 37 connected to VLAN 24, server 38 connected to VLAN 25 and server 39 connected to VLAN 26. Each of the servers 32, 34, 36, 37, 38 and 39 includes a respective MAC address. A table 121 lists VLAN tags identifying for each destination MAC address, the VLAN on which the destination MAC address resides.

Each message packet (such as a frame packet) received at a port of the VLAN switch from an external real device identifies (a) a source MAC address of the external device (such as the MAC address burned into a network adapter card of the external device), although sometimes a hacker will insert the MAC address of another device in the packets it sends, (b) a source IP address, (c) a destination MAC address corresponding to a target device, (d) a destination IP address, (e) a port of the source device, (f) a port of the destination device to identify application to handle the request, and (e) flags pertaining to routing. The packet also includes a "body" which includes data needed for the request. The destination IP address does not always map one-for-one to a VLAN for the following reason. The destination IP address in the packet identifies a subnet that is logically defined by the VLAN switch. Each subnet that is logically defined by the VLAN switch may comprise one or more VLANs. Thus, the VLAN switch attaches a VLAN Tag (based on a table 121 which correlates the destination MAC address in the packet to the VLAN on which the destination device resides) to the packet to "route" the packet through the switch to the VLAN of the target device.

In the illustrated example, if computers 12 or 14 send a (message or frame) packet to port 12, and the packet includes the respective MAC address "A" of computer 12 or MAC address "B" of computer 14 (and a destination MAC address of a server on one of the VLANs 22-26, and the packet is properly formed), then switch 20 will forward the packet to the VLAN of the destination device as indicated by the destination MAC address of the packet. Similarly, if server computer 28 sends a message or frame packet to port 16, and the message or frame includes the MAC address "C" of server 28 (and a destination MAC address of a server on one of the VLANs 22-26, and the packet is properly formed), then switch 20 will forward the packet to the VLAN of the destination device as indicated by the destination MAC address of the packet. However, the MAC address "D" of external client device 30 does not match the MAC address "E" programmed into switch 20 for port 19. Consequently, if device 30 sends a message or frame packet to port 19, and the message or frame includes the MAC address "D" of device 30, then switch 20 will block or discard the packet (even if the packet is properly formed and is not malicious) because port 19 is programmed to recognize only MAC address E (based on CAM table 21). Also, packet evaluation program 50 logs information such as the source MAC address, source IP address, destination MAC address and destination IP address regarding the packet sent from the unrecognized source MAC address D. The external device 30 having the MAC address that does not match the MAC addresses programmed into the switch for the port that received the messages, may be malicious or friendly (but has not been properly registered by the VLAN switch). As explained in more detail below, program 50 automatically decides (in real time) whether "incorrect" packets (such as packets containing an unrecognized source MAC address) pass through the switch to the VLAN of the destination device. If the rate of such "incorrect" packets is below an appropriate threshold rate, then switch 20 will pass the packets. The reason to pass a limited rate of packets from the unrecognized source MAC address is that they may be friendly, and if malicious, will not be sufficient in number to cause concerns, such as a denial of service attack. However, if the rate of such packets exceeds an appropriate threshold rate, then switch 20 will block the excess and advise an administrator. In response, the administrator can reprogram the port if appropriate, to recognize this MAC address as authorized.

Next, program 50 determines the rate of arrival of "incorrect" packets. Program 50 does not know if the incorrect packets are malicious or friendly. However, if the rate of arrival of such packets is below an appropriate current threshold pass-rate, then they may not cause a concern, such as a denial of service attack on the destination device, even if they are malicious. If the rate of arrival of such incorrect packets is below an appropriate current threshold pass-rate then program 50 attaches the VLAN tag to the incorrect packet and passes the incorrect packet to the VLAN of the destination device. In accordance with a feature of the present invention, program 50 dynamically adjusts the current, threshold pass-rate as follows. If the rate of change of arrival of incorrect packets is increasing and greater than a predetermined (increasing) rate of change threshold, then program 50 decreases the current threshold pass-rate. If the rate of change of arrival of incorrect packets is increasing but not greater than the predetermined (increasing) rate of change threshold, then program 50 maintains the current threshold pass-rate. If the rate of change of arrival of incorrect packets is decreasing, and the magnitude of the decrease is greater than a predetermined (decreasing) rate of change threshold, the current threshold pass-rate is set to a nominal pass-rate. If the rate of change of arrival of incorrect packets is decreasing, but is not (decreasing rapidly) above a predetermined (decreasing) rate of change threshold, the current threshold pass-rate is at the attack pass-rate and the rate of incorrect packets is less than the substantial attack pass-rate, then program 50 increases the current threshold pass-rate back to its nominal value.

Figure 2A:
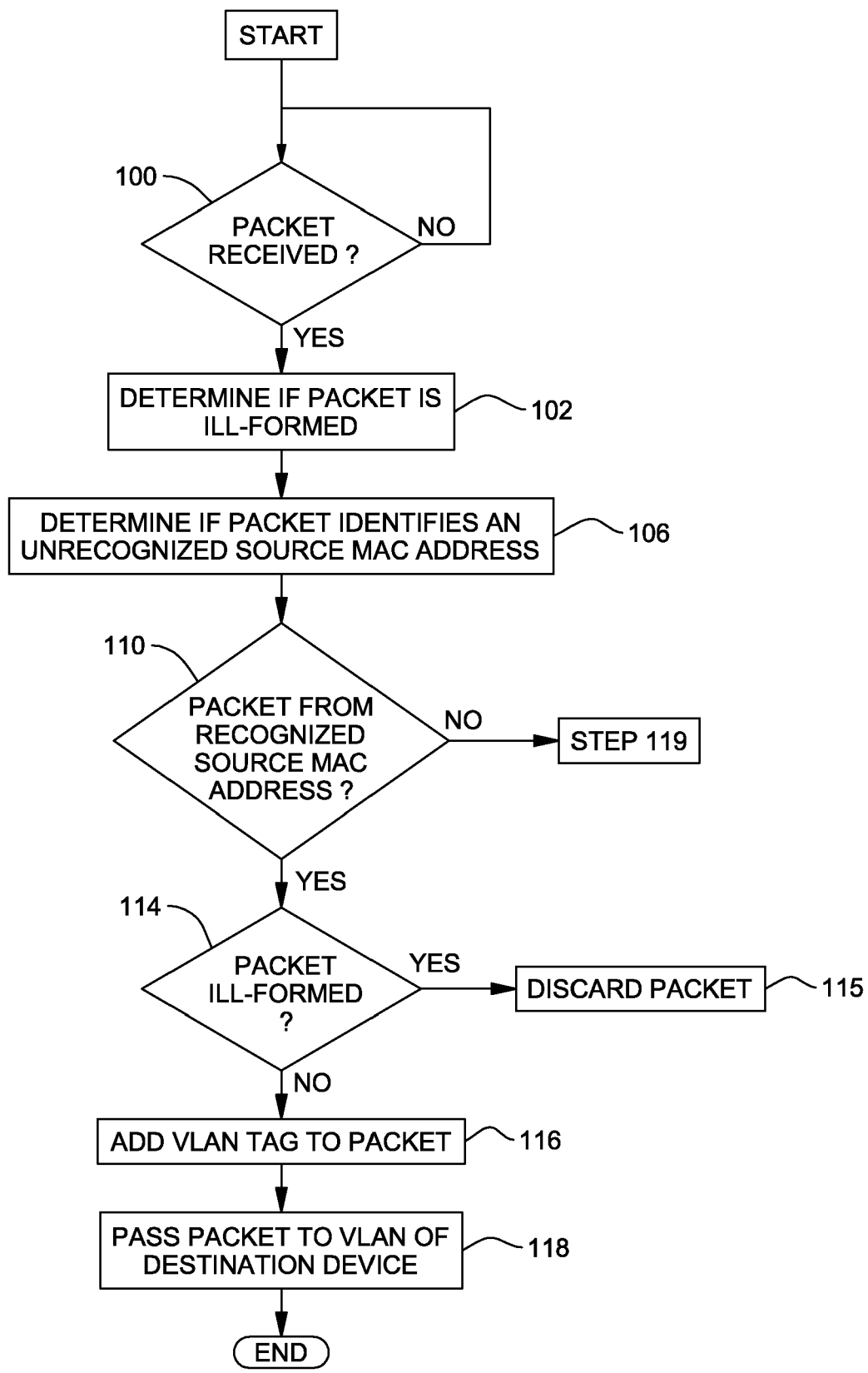
FIGS. 2(A), 2(B) and 2(C) form a flow chart of the packet evaluation program of FIG. 1.
Figure 2B:
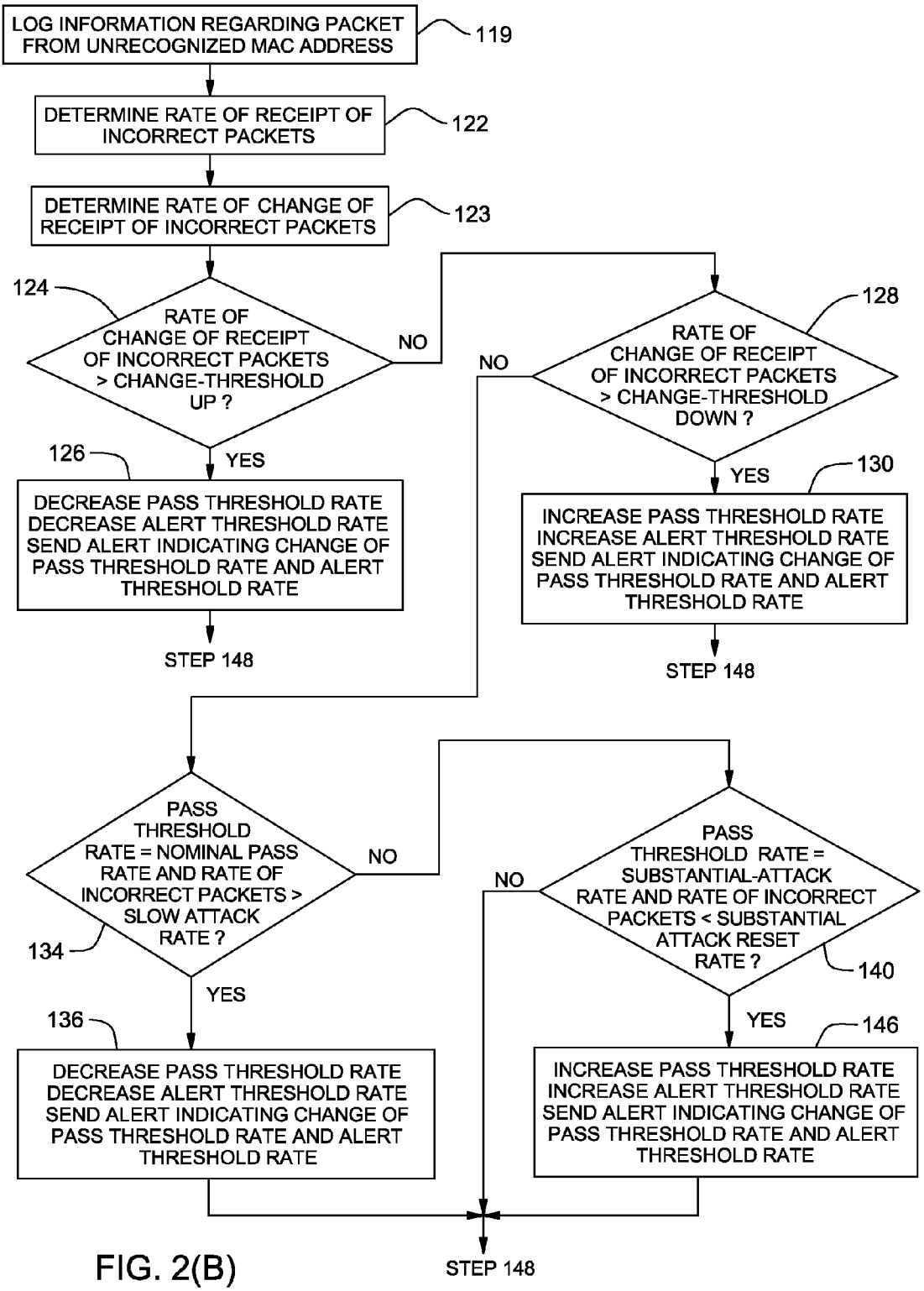
Figure 2C:
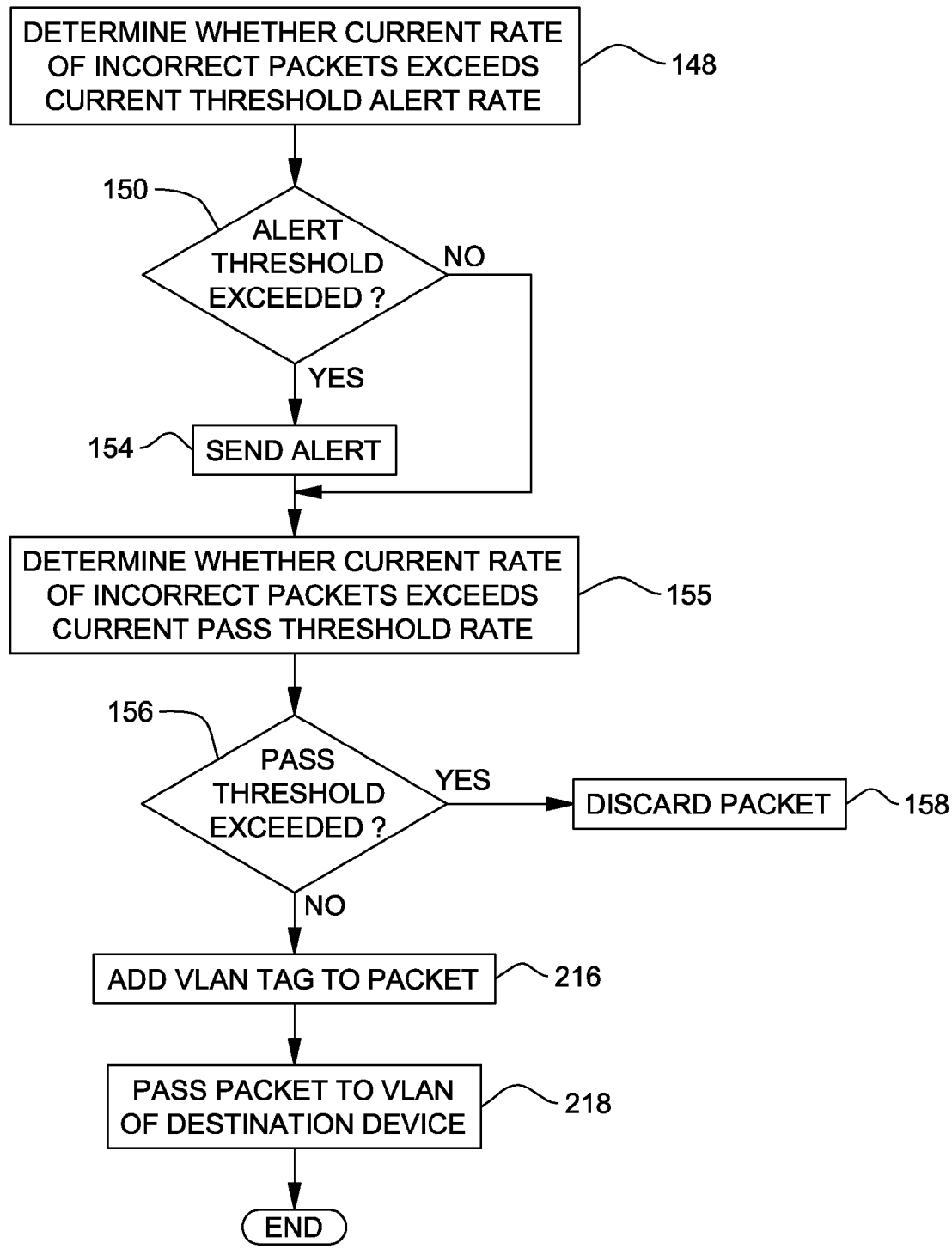

FIGS. 2(A), 2(B) and 2(C) illustrate program 50 and hardware and software function in each of the port 11-19 in more detail. Various terms used in the flowcharts are defined as follows:

"Rate of incorrect pkts": number of (a) ill-formed packets, (b) packets bearing a source MAC address that is not programmed into the port that received the packet, and (c) malicious packets, received per unit of time. An "ill-formed" packet is deficient in its form as defined by the applicable standard, for example, a packet not conforming to the IEEE 802 standards. By way of example, an "ill-formed" packet may be missing a field specified by the applicable standard, the data in a field may be longer or shorter than specified in the field, the data in a field may be one type such as numeric characters whereas the standard specifies alphabetic characters, etc. A packet bearing a source MAC address that is not programmed into the port that received the packet will not be recognized by the port as authorized, and may be friendly or malicious. The following are examples where a port that receives a packet does not recognize the source MAC address of the packet, but the source device is friendly. A single port connects to a server with the capability to create LPARs or virtual systems. As virtual systems are created and removed, the port will see a variety of MAC addresses. The following are examples where a port that receives a packet does not recognize the source MAC address of the packet, and the source device may be malicious. A "malicious" packet can be a packet having a known virus or worm signature, or any modification capable of causing unwanted behavior.

"Nominal pass rate": nominal number of incorrect packets considered to be a normal number by the systems administrator, and not representative of a directed attack. Under normal conditions, the "pass threshold" is set to the "nominal pass rate".

"Pass threshold rate": if the "current rate of incorrect packets" exceeds the "pass threshold rate", and an additional incorrect packet is received in the unit of time, the port will discard the additional incorrect packet.

"Slow attack rate": if the "rate incorrect packets" exceeds the "slow attack rate" and program 50 determines that the port is not currently under a substantial attack, this indicates that a slowly developing attack is occurring, and program 50 sets the "pass threshold rate" to the "substantial attack pass rate". The "slow attack pass rate" is greater than the nominal pass rate. The substantial attack pass rate is lower than nominal pass rate.

"Substantial attack pass rate": the "pass threshold" is set to the "substantial attack pass rate" when program 50 determines that the port is under a substantial attack.

"Substantial attack reset rate": if program 50 determines that the port has been under a substantial attack, but the substantial attack has slowly diminished to the "substantial attack-reset-rate", then program 50 determines that the substantial attack has ended and resets the "pass threshold" to the "substantial attack reset rate". The "substantial attack pass rate" is greater than the "nominal pass rate".

"Rate of change of receipt of incorrect packets": rate of change of the "rate of incorrect pkts" which the port receives from source devices. If the change in the rate of incorrect packets is increasing and greater than the change threshold-up value, then the port or switch is considered to be under substantial attack and the pass threshold is set to the substantial attack pass rate. If the change in the rate of incorrect packets is decreasing and greater in magnitude than the change threshold down value, then the port or switch is considered to be no longer under substantial attack and the pass threshold is set to the nominal value, i.e. nominal pass rate.

"Change threshold up"—if the rate of change of the rate of incorrect packets exceeds the "change threshold up" value, then program 50 determines that the port is under substantial attack.

"Change threshold down"—if the rate of change of the rate of incorrect packets exceeds the "change threshold down" value, then program 50 determines that the port is no longer under substantial attack.

The following relationships apply:
attack reset rate>nominal pass rate
slow attack rate>nominal pass rate
attack pass rate<nominal pass rate To begin the process of FIGS. 2(A) and 2(B), one of the ports of VLAN switch 20 receives a message or frame packet (decision 100, yes branch). Typically, the packet will identify a MAC and IP address of the source device (such as computer 12, computer 14, server 28 or computer 30), a MAC an IP address of a destination device (such as server 32, server 34, server 36, server 37, server 38 or server 39), and a target port representing an application or service on the destination device. In response to receipt of the packet, the switch determines if the packet is properly formed, i.e. conforms to the applicable standard (step 102).

Also, the switch receiving the packet determines (from CAM table 21) if the MAC address of the source device matches a source MAC address previously programmed into VLAN switch 20 for the port that received the packet (decision 110). If so (decision 110, yes branch), and the packet is not ill-formed (decision 114, no branch), then the port (using table 121) correlates the destination MAC address specified in the packet to a corresponding one of the VLANs 22-26 to which the destination device is attached, and adds a corresponding VLAN tag to the packet (step 116). The VLAN tag identifies the IP address of the VLAN to which the destination device is attached. Next, the port notifies the VLAN switch 20 to forward the packet to the VLAN to which the destination device is attached (step 118). (Optionally, the port can be configured to discard all ill-formed packets, and if so, this is implemented as part of decision 114.)

Refer now to decision 110, no branch where the source MAC address of the packet does not match the MAC addressed programmed into the port that received the packet. In response, the port that received the packet keeps the packet in an input buffer, and notifies program 50 of the identity and location of the packet. In response, program 50 logs information from the packet, i.e. source MAC and IP address, destination MAC and IP address, target application port, and time, and the fact that the MAC address of the packet does not match the MAC address programmed into the port. Next, program 50 performs a series of steps to adjust a current pass threshold rate and a current alert threshold rate, if warranted by the rate of change of receipt of incorrect packets and other factors. In one embodiment of the present invention, program 50 performs these steps to adjust a current pass threshold rate and a current alert threshold rate, if warranted, for every packet that is received from an unrecognized source MAC address. In another embodiment of the present invention, program 50 performs these steps to adjust a current pass threshold rate and a current alert threshold rate periodically, for example, every ten seconds. Next, program 50 determines the rate of incorrect packets received by this port by counting the number of incorrect packets received by this port every predetermined interval, such as one second (step 122). Next, program 50 determines the rate of change of incorrect packets received by this port by comparing the change in rate of such packets during prior successive predetermined intervals (step 123). The rate of change of incorrect packets received by the port can be positive/increasing or negative/decreasing. Program 50 does not know if the packets received from the unrecognized MAC address are malicious or friendly, and therefore will not automatically block such packets. If the rate of arrival of such packets is below an appropriate pass threshold rate, then such packets may not result in a denial of service attack on the destination device, even if that is their intent, and switch 20 can pass them to the VLAN of the destination device. (Virus screening and other such filtering, are not shown, but are implemented in firewalls, at the destination device and within other network infrastructure. This can be determined by the network architect.) Next, program 50 dynamically sets the pass threshold rate as follows. Program 50 determines if the current rate of arrival of incorrect packets is increasing and above a predetermined, increasing rate of change threshold (change-threshold-up) (decision 124). If so (decision 124, yes branch), then program 50 decreases the current threshold pass-rate and current threshold alert threshold (step 126). Program 50 decreases the current threshold pass-rate to attack-pass-rate to reduce the harm/burden caused by the packets. Also, program 50 decreases the current threshold alert threshold to a predetermined configurable value set by an administrator. Program 50 also sends an alert to an administrator advising the administrator of the changes to the pass threshold rate and current threshold alert rate. The following is an example of a rapid increase in the rate of arrival of incorrect packets, and resultant changes to the pass threshold rate leading to step 126 in which program 50 dynamically reduces the pass threshold rate. For example, a steady state exists where the Rate of Incorrect Packets Received is ten packets per unit time, the Rate of Change of Incorrect Packets Received Rate is zero packets per unit time per unit time and the administrator has specified the following values: Pass Threshold equal twenty packets per unit time, Attack Pass Rate equal 5 packet per unit time, and Change Threshold Up equal three packets per unit time per unit time. A rapid attack (the number of incorrectly-formed packets received at a port rapidly increases) occurs which causes the value of Rate of Change of Incorrect Packets Received Rate to increase to a value five packets per unit time per unit time. Since the Rate of Change of Incorrect Packets Received Rate is now greater than Change Threshold Up, decision 124, the program will cause the Pass Threshold to be decreased from twenty packets per unit time to the value of Attack Pass Rate which is five packets per unit time. This will reduce the number of incorrectly formed packets passed by the system. An alert can be then sent to the administrator signifying the changes.

Refer again to decision 124, no branch, where the current rate of arrival of increasing packets is not increasing at all or not increasing above the predetermined, increasing rate of change threshold. In such a case, program 50 determines if the current rate of arrival of incorrect packets is decreasing and the rate of decrease is greater (in magnitude) than a predetermined, decreasing rate of change threshold (change-threshold-down) (decision 128). (For example, if the predetermined, decreasing rate of change threshold is negative five packets per second per second, i.e. from one predetermined interval to the next, and the actual rate of change of arrival of incorrect packets decreased by ten packets per second from one predetermined interval to the next, then the current changing rate of arrival of incorrect packets is greater (in magnitude) than the predetermined, decreasing rate of change threshold (decision 128, yes branch). In such a case (decision 128, yes branch), program 50 changes the pass threshold rate to the attack reset rate and also changes the current alert threshold rate to a steady state value set by the system administrator because the pass threshold rate has decreased and we want to be alerted at a new, lower level of incorrect packets received (step 130). Program 50 also sends an alert to an administrator advising the administrator of the changes to the pass threshold rate and alert threshold rate. The following example assumes that the switch had been under attack and the pass threshold and the alert threshold had been set to a lower value. The attack quickly stops, and the pass threshold and alert thresholds are reset to their nominal values (step 130 in which program 50 dynamically changes the pass threshold rate to the attack reset rate). For example, during a rapid de-attack the Rate of Incorrect Packets Received is fifty packets per unit time, the Change Threshold Up value is three packets per unit time per unit time, and the Change Threshold Down value is two packets per unit time per unit time. The Rate of Incorrect Packets is fifty pkts per unit time during the attack. As the attack subsides the Rate of Incorrect Packet Received drops to twenty two and the Rate of Change of Receive Rate becomes a negative twenty packets per unit time per unit time due to the rapid decrease in Rate of Incorrect Packets Received. Thus the decision 124 Rate of Incorrect Packet Received>Change Threshold Up becomes false, minus twenty is not greater than three, causing the evaluation of decision 128 Negative Rate of Incorrect Packet Received Rate>Change Threshold Down, which evaluates as true since twenty is greater than two. This causes the Change Pass Threshold and Alert Threshold values to be reset to the normal level. An alert may be sent to the administrator signifying the changes.

Refer again to decision 128, no branch, where the current rate of change of arrival of incorrect packets is not greater (in magnitude) than the predetermined, decreasing rate of change threshold. In such a case, program 50 determines if the pass threshold rate is set to a predetermined nominal pass threshold rate and the rate of arrival of incorrect packets is greater than a predetermined slow-attack rate (decision 134, yes branch). The predetermined slow-attack rate is greater than the nominal pass threshold rate, for example, double the predetermined nominal pass threshold rate. Then program 50 decreases the pass threshold rate to the attack pass rate and decreases the alert threshold rate (step 136). Program 50 decreases the pass threshold rate because an attack is slowly developing. Program 50 decreases the alert threshold rate to a predetermined value set by the system administrator because the pass threshold rate has changed and the administrator should be alerted at a new, lower level of incorrect packets received. Program 50 also sends an alert to an administrator advising the administrator of the changes to the pass threshold rate and alert threshold rate. In the following example, the number of ill-formed packets is slowly increasing, (the rate of increase is less than the thresholds set to observe a rapidly increasing attack). For example, this attack may increase so slowly that it takes multiple days to become significant. At some point, even though the rate of increase is small, the rate of arrival of incorrect packets will exceed a threshold (decision 134), and changes to the pass threshold rate leading to step 136 in which program 50 dynamically changes the pass threshold rate to the attack_pass_rate. For example, during an attack where the number of incorrect packets is slowly increasing over time the Rate of Change of Received Rate might be one packet per unit time per unit time, with a Rate of Incorrect Packets Received starting at ten and slowly increasing to forty one packets per unit time. The pre slow-attack values of Nominal Pass Threshold and Pass Threshold are both set to twenty packets per unit time, the Change Threshold UP value is set to three packets per unit time per unit time, the Change Threshold Down value is set to negative two packets per unit time per unit time, and the Slow Attack Rate is set to forty packet per unit time are all pre configured by the administrator. The decision 124 (Rate of Change of Incorrect Packets Received Rate>Change Threshold Up) will evaluate to false because one is not greater than three. This causes the evaluation of the decision 128 ((Negative) Rate of Change of Incorrect Packets Received Rate>Change Threshold Down), which evaluates as false because minus two is not greater than one. Which in turn causes the evaluation of decision 134 {Pass Threshold=Nominal Pass Rate) and (Rate of Incorrect Packets>Slow Attack Rate)} as true because forty one is greater than forty. This results in a decrease of the Pass Threshold Rate and Alert Threshold Rate values. An alert is sent to the administrator signifying the changes.

Refer again to decision 134, no branch where the pass threshold rate is not set at the nominal pass threshold rate or the rate of arrival of incorrect packets is not greater than the slow-attack rate. In such a case, program 50 determines if the pass threshold rate equals the substantial attack pass rate and the rate of arrival of incorrect packets is less than the substantial attack reset rate (decision 140). If not (decision 140, no branch), then program 50 makes no changes to either the pass threshold rate or alert threshold rate. However, if the current pass threshold rate equals the substantial attack pass rate and the rate of arrival of incorrect packets is less than the substantial attack reset rate (decision 140, yes branch), then program 50 increases the pass threshold rate to the attack reset rate and increases the alert threshold rate to a predetermined value set by the system administrator (step 146). Program 50 increases the pass threshold rate because the attack has subsided. Program 50 increases the alert threshold rate because the pass threshold rate has increased and we want to be alerted at a new, higher level of incorrect packets received. Program 50 also sends an alert to an administrator advising the administrator of the changes to the pass threshold rate and alert threshold rate. In the following example, the switch has been under "attack", receiving a large number of ill-formed packets. Following this event, over a long period of time, the rate of ill-formed packets received slowly declined toward a nominal rate. When this rate of received ill-informed packets declined below the attach reset rate, program 50 dynamically increases the pass threshold rate to the attack reset rate in step 146. For example, during a slow de-attack where the Rate of Incorrect Packets Received is one hundred packets per unit time during the attack, the Change Threshold Up value is three packets per unit time per unit time, and the Change Threshold Down value is two packets per unit time per unit time. The Rate of Change of Incorrect Packets Received Rate is greater than the Change Threshold Up value during the attack. As the attack slowly subsides the Rate of Incorrect Packet Received drops to twenty eight packets per unit time and the Rate of Change of Receive Rate becomes a negative one due to the slow decrease in Rate of Incorrect Packets Received. Thus the decision 124 (Rate of Incorrect Packet Received>Change Threshold Up) becomes false, negative one is not greater than three, causing the evaluation of decision 128 (Negative Rate of Incorrect Packet Received Rate>Change Threshold Down), which evaluates as false since −1 is greater not than 2. Which in turn causes the evaluation of decision 134 (Pass Threshold=Nominal Pass Rate) as false because five is not equal to twenty. This causes evaluation of decision 140, (Rate of Incorrect Packets<Attack Reset Rate), which evaluates to true since 28 is less than 30. At this point, it is known that the attack has slowly subsided and the current rate of ill-formed packets received is less than the attack reset rate. This results in an increase of the Pass Threshold Rate and Alert Threshold Rate values. An alert is sent to the administrator signifying the changes.

After any of steps 126, 130, 136 or 146 (where the pass threshold rate and alert threshold rate are changed) or after decision 140, no branch (where the pass threshold rate and alert threshold rate are not changed), program 50 proceeds to step 148 to determine whether the current rate of incorrect packets exceeds the current alert threshold rate (step 148). If so (decision 150, yes branch), then program 50 sends a corresponding alert to the administrator (step 154). If not (decision 150, no branch), or after the alert is sent in step 154, then program 50 determines whether the current rate of incorrect packets exceeds the current pass threshold rate (step 155). If so (decision 156, yes branch), then program 50 blocks the current packet with the improper source MAC address by discarding the packet (step 158). However, if the current rate of incorrect packets does not exceed the current pass threshold rate (decision 156, no branch), then program 50 checks table 121 to identify the VLAN to which the destination device corresponding to the destination MAC address is attached, and attaches the VLAN tag to the packet (step 216). Next, based on the VLAN tag, program 50 forwards the packet to the VLAN to which the destination device is attached (step 218).

Thus, program 50 will allow packets with an unrecognized source MAC address to pass through switch 20 to the VLAN of the destination device if the total rate of incorrect packets is less than the current pass threshold rate. This is because such packets with an unrecognized source MAC address may not pose a serious risk to the destination device. Program 50 also dynamically adjusts the current pass threshold rate based on the rate of change of arrival of incorrect packets because when a substantial attack is identified, the burden to the destination device should be reduced.

Program 50 can be loaded into switch 20 from a computer readable media 157 such as magnetic disk or tape, optical media, DVD, memory stick, semiconductor memory, etc. or downloaded from Internet 159 via a TCP/IP adapter card 161. The program can also be embodied in non-volatile memory, combinatorial logic, or other forms of intergrated circuits.

Based on the foregoing, a computer system, method and program product for controlling access to a VLAN have been disclosed. However, numerous modifications and substitutions can be made without deviating from the scope of the present invention. For example, instead of dynamically adjusting the thresholds as each packet is received, one can adjust the threshold at predefined intervals, such as each second. Therefore, the present invention has been disclosed by way of illustration and not limitation, and reference should be made to the following claims to determine the scope of the present invention.

What is claimed is:

1. A method for controlling access to a VLAN via a port of a VLAN switch system, said method comprising:
    responsive to receipt of a message packet at said port, determining by the switch system an existence of a non-matching condition, said non-matching condition being that a Media Access Control (MAC) address of said message packet does not match a MAC address for which said port has been programmed to recognize as a MAC address of a device authorized to communicate with said port;
    after said determining the existence of the non-matching condition, determining a number of ill-formed packets received per unit time, each ill-formed packet having a format not conforming to an applicable industry standard;
    after said determining the existence of the non-matching condition, determining a number of received misaddressed packets per unit time, each received misaddressed packet bearing a source MAC address that is not programmed into the port that received each misaddressed packet;
    determining a rate of incorrect packets, said determined rate of incorrect packets comprising a sum of said determined number of ill-formed packets received per unit time and said determined number of received misaddressed packets per unit time;
    ascertaining that said determined rate of incorrect packets exceeds a pass threshold rate; and
    responsive to said ascertaining, discarding the message packet.

2. The method of claim 1, said method further comprising:
    after said determining the rate of incorrect packets and before said ascertaining,
        determining that a first condition exists, said first condition being that a rate of change of the rate of incorrect packets is positive and exceeds a specified change-threshold up; and
        after said determining that the first condition exists, decreasing the pass threshold rate.

3. The method of claim 1, said method further comprising:
    after said determining the rate of incorrect packets and before said ascertaining,
        determining that a first condition does not exist, said first condition being that a rate of change of the rate of incorrect packets is positive and exceeds a specified change-threshold up;
        after said determining that the first condition does not exist, determining that a second condition exists, said second condition being that the rate of change of the rate of incorrect packets is negative and has a magnitude that exceeds a specified change-threshold down;
        after said determining that the second condition exists, increasing the pass threshold rate.

4. The method of claim 1, said method further comprising:
    after said determining the rate of incorrect packets and before said ascertaining,
        determining that a first condition does not exist, said first condition being that a rate of change of the rate of incorrect packets is positive and exceeds a specified change-threshold up;
        after said determining that the first condition does not exist, determining that a second condition does not exist, said second condition being that the rate of change of the rate of incorrect packets is negative and has a magnitude that exceeds a specified change-threshold down;
        after said determining that the second condition does not exist, determining that a third condition exists, said third condition being that the pass threshold rate is equal to a specified nominal pass threshold rate and that the rate of incorrect packets exceeds a specified slow-attack rate that is greater than the nominal pass rate; and
        after said determining that the third condition exists, decreasing the pass threshold rate.

5. The method of claim 1, said method further comprising:
    after said determining the rate of incorrect packets and before said ascertaining,
        determining that a first condition does not exist, said first condition being that a rate of change of the rate of incorrect packets is positive and exceeds a specified change-threshold up;
        after said determining that the first condition does not exist, determining that a second condition does not exist, said second condition being that the rate of change of the rate of incorrect packets is negative and has a magnitude that exceeds a specified change-threshold down;
        after said determining that the second condition does not exist, determining that a third condition does not exist, said third condition being that the pass threshold rate is equal to a specified nominal pass threshold rate and that the rate of incorrect packets exceeds a specified slow-attack rate that is greater than the nominal pass rate; and
        after said determining that the third condition does not exist, increasing the pass threshold rate.

6. The method of claim 1, said method further comprising:
    after said determining the existence of the non-matching condition and before said determining the rate of incorrect packets, determining a number of received malicious packets per unit time, each malicious packet having a known virus or worm signature, said rate of incorrect packets comprising said sum incremented by the determined number of received malicious packets per unit time.

7. The method of claim 1, said method further comprising:
    after said determining the rate of incorrect packets and before said ascertaining,
        determining that the rate of incorrect packets exceeds a current alert threshold rate; and
        responsive to said determining that the rate of incorrect packets exceeds the current alert threshold rate, sending an alert to an administrator of the VLAN or the switch system.

8. A computer program product for controlling access to a VLAN via a port of a VLAN switch system, said computer program product comprising:
    a computer readable physically tangible storage device;
    first program instructions, responsive to receipt of a message packet at said port, for determining by the switch system an existence of a non-matching condition, said non-matching condition being that a Media Access Control (MAC) address of said message packet does not match a MAC address for which said port has been programmed to recognize as a MAC address of a device authorized to communicate with said port;
    second program instructions, after said determining by the first program instructions the existence of the non-matching condition, for determining a number of ill-formed packets received per unit time, each ill-formed packet having a format not conforming to an applicable industry standard;

third program instructions, after said determining by the first program instructions the existence of the non-matching condition, for determining a number of received misaddressed packets per unit time, each received misaddressed packet bearing a source MAC address that is not programmed into the port that received each misaddressed packet;

fourth program instructions for determining a rate of incorrect packets, said determined rate of incorrect packets comprising a sum of said number of ill-formed packets received per unit time as determined by the second program instructions and said number of received misaddressed packets per unit time as determined by the third program instructions;

fifth program instructions for ascertaining that said rate of incorrect packets as determined by the fourth program instructions exceeds a pass threshold rate; and sixth program instructions, responsive to said ascertaining by the fifth program instructions, for discarding the message packet, wherein the first program instructions, the second program instructions, the third program instructions, the fourth program instructions, the fifth program instructions, and the sixth program instructions are stored on the computer readable physically tangible storage device.

9. The computer program product of claim 8, said computer program product further comprising: after said determining the rate of incorrect packets by the fourth program instructions and before said ascertaining by the fifth program instructions, seventh program instructions for determining that a first condition exists, said first condition being that a rate of change of the rate of incorrect packets is positive and exceeds a specified change-threshold up; and eighth program instructions, after said determining by the seventh program instructions that the first condition exists, for decreasing the pass threshold rate, wherein the seventh program instructions and the eighth program instructions are stored on the computer readable physically tangible storage device.

10. The computer program product of claim 8, said computer program product further comprising: after said determining the rate of incorrect packets by the fourth program instructions and before said ascertaining by the fifth program instructions, seventh program instructions for determining that a first condition does not exist, said first condition being that a rate of change of the rate of incorrect packets is positive and exceeds a specified change-threshold up;

eighth program instructions, after said determining by the seventh program instructions that the first condition does not exist, for determining that a second condition exists, said second condition being that the rate of change of the rate of incorrect packets is negative and has a magnitude that exceeds a specified change-threshold down;

ninth program instructions, after said determining that the second condition exists, increasing the pass threshold rate, wherein the seventh program instructions, the eighth program instructions, and the ninth program instructions are stored on the computer readable physically tangible storage device.

11. The computer program product of claim 8, said computer program product further comprising: after said determining the rate of incorrect packets by the fourth program instructions and before said ascertaining by the fifth program instructions, seventh program instructions for determining that a first condition does not exist, said first condition being that a rate of change of the rate of incorrect packets is positive and exceeds a specified change-threshold up;

eighth program instructions, after said determining by the seventh program instructions that the first condition does not exist, for determining that a second condition does not exist, said second condition being that the rate of change of the rate of incorrect packets is negative and has a magnitude that exceeds a specified change-threshold down;

ninth program instructions, after said determining by the eighth program instructions that the second condition does not exist, for determining that a third condition exists, said third condition being that the pass threshold rate is equal to a specified nominal pass threshold rate and that the rate of incorrect packets exceeds a specified slow-attack rate that is greater than the nominal pass rate; and tenth program instructions, after said determining by the ninth program instructions that the third condition exists, decreasing the pass threshold rate, wherein the seventh program instructions, the eighth program instructions, the ninth program instructions, and the tenth program instructions are stored on the computer readable physically tangible storage device.

12. The computer program product of claim 8, said computer program product further comprising: after said determining the rate of incorrect packets by the fourth program instructions and before said ascertaining by the fifth program instructions, seventh program instructions for determining that a first condition does not exist, said first condition being that a rate of change of the rate of incorrect packets is positive and exceeds a specified change-threshold up;

eighth program instructions, after said determining by the seventh program instructions that the first condition does not exist, for determining that a second condition does not exist, said second condition being that the rate of change of the rate of incorrect packets is negative and has a magnitude that exceeds a specified change-threshold down;

ninth program instructions, after said determining by the eighth program instructions that the second condition does not exist, for determining that a third condition does not exist, said third condition being that the pass threshold rate is equal to a specified nominal pass threshold rate and that the rate of incorrect packets exceeds a specified slow-attack rate that is greater than the nominal pass rate; and tenth program instructions, after said determining by the ninth program instructions that the third condition does not exist, increasing the pass threshold rate, wherein the seventh program instructions, the eighth program instructions, the ninth program instructions, and the tenth program instructions are stored on the computer readable physically tangible storage device.

13. The computer program product of claim 8, said computer program product further comprising:

seventh program instructions, after said determining the existence of the non-matching condition by the first program instructions and before said determining the rate of incorrect packets by the fourth program instructions, for determining a number of received malicious packets per unit time, each malicious packet having a known virus or worm signature, said rate of incorrect packets comprising said sum incremented by the number of received malicious packets per unit time determined by the seventh program instructions, wherein the seventh program instructions are stored on the computer readable physically tangible storage device.

14. The computer program product of claim 8, said computer program product further comprising: after said determining the rate of incorrect packets by the fourth program instructions and before said ascertaining by the fifth program instructions, seventh program instructions for determining that the rate of incorrect packets exceeds a current alert threshold rate; and eighth program instructions, responsive to said determining that the rate of incorrect packets exceeds the current alert threshold rate as determined by the seventh program instructions, for sending an alert to an administrator of the VLAN or the switch system, wherein the seventh program instructions and the eighth program instructions are stored on the computer readable physically tangible storage device.

15. A computer system for controlling access to a VLAN via a port of a VLAN switch system, said computer system comprising:

a computer;

a computer readable memory;

a computer readable storage medium;

first program instructions, responsive to receipt of a message packet at said port, for determining by the switch system an existence of a non-matching condition, said non-matching condition being that a Media Access Control (MAC) address of said message packet does not match a MAC address for which said port has been programmed to recognize as a MAC address of a device authorized to communicate with said port;

second program instructions, after said determining by the first program instructions the existence of the non-matching condition, for determining a number of ill-formed packets received per unit time, each ill-formed packet having a format not conforming to an applicable industry standard;

third program instructions, after said determining by the first program instructions the existence of the non-matching condition, for determining a number of received misaddressed packets per unit time, each received misaddressed packet bearing a source MAC address that is not programmed into the port that received each misaddressed packet;

fourth program instructions for determining a rate of incorrect packets, said determined rate of incorrect packets comprising a sum of said number of ill-formed packets received per unit time as determined by the second program instructions and said number of received misaddressed packets per unit time as determined by the third program instructions;

fifth program instructions for ascertaining that said rate of incorrect packets as determined by the fourth program instructions exceeds a pass threshold rate; and sixth program instructions, responsive to said ascertaining by the fifth program instructions, for discarding the message packet, wherein the first program instructions, the second program instructions, the third program instructions, the fourth program instructions, the fifth program instructions, and the sixth program instructions are stored on the computer readable storage medium for execution by the computer via the computer readable memory.

16. The computer system of claim 15, said computer system further comprising: after said determining the rate of incorrect packets by the fourth program instructions and before said ascertaining by the fifth program instructions, seventh program instructions for determining that a first condition exists, said first condition being that a rate of change of the rate of incorrect packets is positive and exceeds a specified change-threshold up; and eighth program instructions, after said determining by the seventh program instructions that the first condition exists, for decreasing the pass threshold rate, wherein the seventh program instructions and the eighth program instructions are stored on the computer readable storage medium for execution by the computer via the computer readable memory.

17. The computer system of claim 15, said computer system further comprising: after said determining the rate of incorrect packets by the fourth program instructions and before said ascertaining by the fifth program instructions, seventh program instructions for determining that a first condition does not exist, said first condition being that a rate of change of the rate of incorrect packets is positive and exceeds a specified change-threshold up;

eighth program instructions, after said determining by the seventh program instructions that the first condition does not exist, for determining that a second condition exists, said second condition being that the rate of change of the rate of incorrect packets is negative and has a magnitude that exceeds a specified change-threshold down;

ninth program instructions, after said determining that the second condition exists, increasing the pass threshold rate, wherein the seventh program instructions, the eighth program instructions, and the ninth program instructions are stored on the computer readable storage medium for execution by the computer via the computer readable memory.

18. The computer system of claim 15, said computer system further comprising: after said determining the rate of incorrect packets by the fourth program instructions and before said ascertaining by the fifth program instructions, seventh program instructions for determining that a first condition does not exist, said first condition being that a rate of change of the rate of incorrect packets is positive and exceeds a specified change-threshold up;

eighth program instructions, after said determining by the seventh program instructions that the first condition does not exist, for determining that a second condition does not exist, said second condition being that the rate of change of the rate of incorrect packets is negative and has a magnitude that exceeds a specified change-threshold down;

ninth program instructions, after said determining by the eighth program instructions that the second condition does not exist, for determining that a third condition exists, said third condition being that the pass threshold rate is equal to a specified nominal pass threshold rate and that the rate of incorrect packets exceeds a specified slow-attack rate that is greater than the nominal pass rate; and tenth program instructions, after said determining by the ninth program instructions that the third condition exists, decreasing the pass threshold rate, wherein the seventh program instructions, the eighth program instructions, the ninth program instructions, and the tenth program instructions are stored on the computer readable storage medium for execution by the computer via the computer readable memory.

19. The computer system of claim 15, said computer system further comprising: after said determining the rate of incorrect packets by the fourth program instructions and before said ascertaining by the fifth program instructions, seventh program instructions for determining that a first condition does not exist, said first condition being that a rate of change of the rate of incorrect packets is positive and exceeds a specified change-threshold up;

eighth program instructions, after said determining by the seventh program instructions that the first condition does not exist, for determining that a second condition does not exist, said second condition being that the rate of change of the rate of incorrect packets is negative and has a magnitude that exceeds a specified change-threshold down;

ninth program instructions, after said determining by the eighth program instructions that the second condition does not exist, for determining that a third condition does not exist, said third condition being that the pass threshold rate is equal to a specified nominal pass threshold rate and that the rate of incorrect packets exceeds a specified slow-attack rate that is greater than the nominal pass rate; and tenth program instructions, after said determining by the ninth program instructions that the third condition does not exist, increasing the pass threshold rate, wherein the seventh program instructions, the eighth program instructions, the ninth program instructions, and the tenth program instructions are stored on the computer readable storage medium for execution by the computer via the computer readable memory.

20. The computer system of claim 15, said computer system further comprising:

seventh program instructions, after said determining the existence of the non-matching condition by the first program instructions and before said determining the rate of incorrect packets by the fourth program instructions, for determining a number of received malicious packets per unit time, each malicious packet having a known virus or worm signature, said rate of incorrect packets comprising said sum incremented by the number of received malicious packets per unit time determined by the seventh program instructions, wherein the seventh program instructions are stored on the computer readable storage medium for execution by the computer via the computer readable memory.

* * * * *